United States Patent
Lin

(10) Patent No.: US 9,575,540 B1
(45) Date of Patent: Feb. 21, 2017

(54) POWER CONSUMPTION MANAGEMENT DEVICE, SYSTEM AND METHOD THEREOF

(71) Applicant: HON HAI PRECISION INDUSTRY CO., LTD., New Taipei (TW)

(72) Inventor: Kun-Ming Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/814,916

(22) Filed: Jul. 31, 2015

(51) Int. Cl.
  *G06F 1/26* (2006.01)
  *G06F 1/32* (2006.01)

(52) U.S. Cl.
  CPC .......... *G06F 1/3234* (2013.01); *G06F 1/3206* (2013.01)

(58) Field of Classification Search
  CPC ................ G06F 1/3206; G06F 1/3234
  USPC ......................... 713/300, 320, 340
  See application file for complete search history.

(56) References Cited

U.S. PATENT DOCUMENTS 7,461,273 B2 * 12/2008 Moore ................ G06F 1/206
  709/224
9,250,684 B1 * 2/2016 Chen ................ G06F 1/3206

* cited by examiner

*Primary Examiner* — Mark Connolly
(74) *Attorney, Agent, or Firm* — Zhigang Ma

(57) ABSTRACT

A power consumption management method including acquiring total power consumption of a consumption object in real time, determining whether the total power consumption of the consumption object is greater than or equal to a predetermined upper threshold, determining one or more servers whose current power consumption is greater than or equal to a first predetermined percent of a full-load power as high-consuming servers, when the total power consumption of the consumption object is greater than or equal to the predetermined upper threshold, determining whether a quantity of the high-consuming servers is greater than or equal to a predetermined value, and setting a maximum CPU utilization of each server as a second predetermined percent when the quantity of the high-consuming servers is greater than or equal to the predetermined value.

12 Claims, 2 Drawing Sheets

POWER CONSUMPTION MANAGEMENT DEVICE, SYSTEM AND METHOD THEREOF

FIELD

The subject matter herein generally relates to power consumption control technology, and particularly to a power consumption management device, a system, and a method for controlling power consumption of a consumption object.

BACKGROUND

In electric power industry, demand is an average value of power during a preset cycle, such as fifteen minutes, and maximum demand is a greatest value of the demand during an electric charge accounting period, such as a month. The maximum demand usually is predetermined by a consumer. Electric charges of the consumer are calculated according to the maximum demand predetermined by the consumer, if the predetermined maximum demand is too high, more basic electric charges may be applied, if the predetermined maximum demand is too low, more extra electric charges may be applied.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
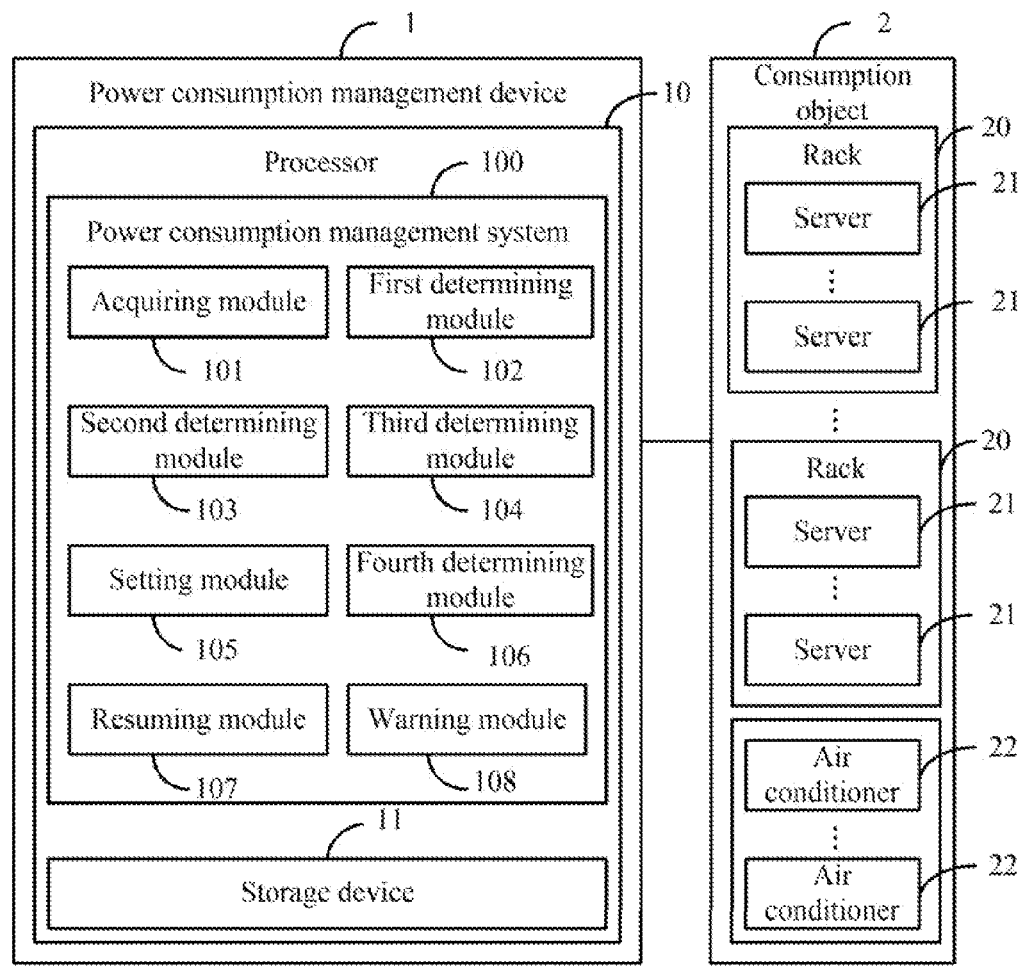
FIG. 1 is a block diagram of a power consumption management system of one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 illustrates a block diagram of a power consumption management system 100 for controlling power consumption of a consumption object 2. The power consumption management system 100 runs on a power consumption management device 1. The power consumption management device 1 includes, but is not limited to, a processor 10 and a storage device 11. In at least one embodiment, the power consumption management device 1 can be a personal computer, a server, or a work station. FIG. 1 illustrates only one example of the power consumption management device 1 that can include more or fewer components than illustrated, or have a different configuration of the various components in other embodiments.

In at least one embodiment, the consumption object 2 can be a data center, which includes, but is not limited to, a number of racks 20, a number of servers 21 placed on the racks 20, and a number of air conditioners 22. The power consumption management device 1 is connected with the number of racks 20, servers 21, and air conditioners 22. A maximum demand of the consumption object 2 is predetermined by an administrator of the consumption object 2 according to a total power consumption of the consumption object 2.

In at least one embodiment, the total power consumption of the equipment in the consumption object 2 except the servers 21 are smaller than the power consumption of the servers 21, thus the power consumption management system 100 and the power consumption management device 1 control the power consumption of the servers 21 to achieve the function of controlling the power consumption of the consumption object 2. In other embodiments, the consumption object 2 can be a company, a manufacturing shop, and the racks 20, the servers 21, and the air conditioners 22 can be other suitable devices, such as lathes.

In at least one embodiment, the storage device 11 can include various types of non-transitory computer-readable storage mediums. For example, the storage device 11 can be an internal storage system, such as a flash memory, a random access memory (RAM) for temporary storage of information, and/or a read-only memory (ROM) for permanent storage of information. The storage device 11 can also be an external storage system, such as a hard disk, a storage card, or a data storage medium. The at least one processor 10 can be a central processing unit (CPU), a microprocessor, or other data processor chip that performs functions of the power consumption management system 100.

As illustrated in FIG. 1, the power consumption management system 100 includes an acquiring module 101, a first determining module 102, a second determining module 103, a third determining module 104, a setting module 105, a fourth determining module 106, a releasing module 107, and a warning module 108. The modules 101-108 of the power consumption management system 100 can be collections of software instructions stored in the storage device 11 of the power consumption management device 1 and executed by the processor 10 of the power consumption management device 1. The modules 101-108 of the power consumption management system 100 also can include functionality represented as hardware or integrated circuits, or as software and hardware combinations, such as a special-purpose processor or a general-purpose processor with special-purpose firmware.

The acquiring module 101 is used to acquire the total power consumption of the consumption object 2 in real time. In at least one embodiment, the total power consumption of the consumption object 2 is substantially equal to a sum of power consumption of the racks 20 and the servers 21, the acquiring module 101 acquires the sum of the power consumption of the racks 20 and the servers 21 to acquire the total power consumption of the consumption object 2.

In other embodiments, the total power consumption of the consumption object 2 is substantially equal to a sum of the power consumption of the servers 21 and the air conditioners 22, the acquiring module 101 acquires the sum of the power consumption of the servers 21 and the air conditioners 22 to acquire the total power consumption of the consumption object 2. The total power consumption of the consumption object 2 also can be substantially equal to a sum of the power consumption of the racks 20, the servers 21, and the air conditioners 22, the acquiring module 101 acquires the sum of the power consumption of the racks 20, the servers 21, and the air conditioners 22 to acquire the total power consumption of the consumption object 2.

The first determining module 102 is used to determine whether the total power consumption of the consumption object 2 is greater than or equal to a predetermined upper threshold. In at least one embodiment, the predetermined upper threshold is ninety percent of the predetermined maximum demand, in other embodiments, the predetermined upper threshold also can be changed to any other suitable values.

When the total power consumption of the consumption object 2 is greater than or equal to the predetermined upper threshold, the second determining module 103 determines the servers 21 whose current power consumption is greater than or equal to a first predetermined percent of a full-load power as high-consuming servers 21. In at least one embodiment, the first predetermined percent is eighty percent, and the second determining module 103 determines the servers 21 whose current power consumption is greater than or equal to eighty percent of the full-load power as the high-consuming servers 21.

The third determining module 104 is used to determine whether a quantity of the high-consuming servers 21 is greater than or equal to a predetermined value. In at least one embodiment, the predetermined value is thirty percent of a total quantity of the servers 21, the third determining module 104 determines whether the quantity of the high-consuming servers 21, namely the servers 21 whose current power consumption is greater than or equal to eighty percent of the full-load power, is greater than or equal to thirty percent of the total quantity of the servers 21.

When the quantity of the high-consuming servers 21 is greater than or equal to the predetermined value, the setting module 105 sets a maximum CPU utilization of each server 21 as a second predetermined percent. In at least one embodiment, when the quantity of the high-consuming servers 21 is greater than or equal to the predetermined value, which represents that the total power consumption of the consumption object 2 may be greater than the predetermined maximum demand, the setting module 105 sets the maximum CPU utilization of each server 21 as the second predetermined percent to limit the CPU utilization of each server 21 to be below the second predetermined percent, thus to avoid the total power consumption of the consumption object 2 being greater than the predetermined maximum demand. In at least one embodiment, the second predetermined percent is eighty percent, in other embodiments, the second predetermined percent also can be changed to any other suitable values, such as sixty percent.

Due to most of the power consumption of the servers 21 being occupied by the CPUs of the servers 21, limiting maximum utilizations of the CPUs can contribute to controlling the total power consumption of the servers 21. Furthermore, limiting maximum utilizations of the CPUs of the servers 21 can control the total power consumption of the consumption object 2, thus preventing the total power consumption of the consumption object 2 from being greater than the predetermined maximum demand.

When the total power consumption of the consumption object 2 is less than the predetermined upper threshold, the fourth determining module 106 determines whether the total power consumption of the consumption object 2 is less than a predetermined lower threshold. In at least one embodiment, the predetermined lower threshold is seventy percent of the predetermined maximum demand, in other embodiments, the predetermined lower threshold also can be changed to any other suitable values.

When the total power consumption of the consumption object 2 is less than the predetermined lower threshold, the resuming module 107 resumes the maximum CPU utilizations of all of the servers 21 as one hundred percent. Usually, when the total power consumption of the consumption object 2 is less than the predetermined lower threshold, which represents that the servers 21 are not working at peak performance, or the servers 21 are working at off-peak period, and the power consumption of the consumption object 2 may be very less than the predetermined maximum demand. Thus, the resuming module 107 resumes the maximum CPU utilizations of all of the servers 21 as one hundred percent to improve work efficiency of the servers 21.

When the quantity of the high-consuming servers 21 is less than the predetermined value and the total power consumption of the consumption object 2 is greater than or equal to the predetermined upper threshold, the warning module 108 produces a signal to warn that the predetermined maximum demand is too low. When the quantity of the high-consuming servers 21 is less than the predetermined value but the total power consumption of the consumption object 2 is greater than or equal to the predetermined upper threshold, which represents that the total power consumption of the servers 21 is not high but the total power consumption of the consumption object 2 still have a risk of being greater than the predetermined maximum demand, thus the predetermined maximum demand is too low, the warning module 108 produces the signal to warn the administrator of the consumption object 2 to reset the maximum demand.

In at least one embodiment, the predetermined upper threshold, the predetermined lower threshold, the first predetermined percent, the second predetermined percent, and the predetermined value are adjustable parameters. Optimum parameter value can be acquired by analyzing historical data of the container 2.

Figure 2:
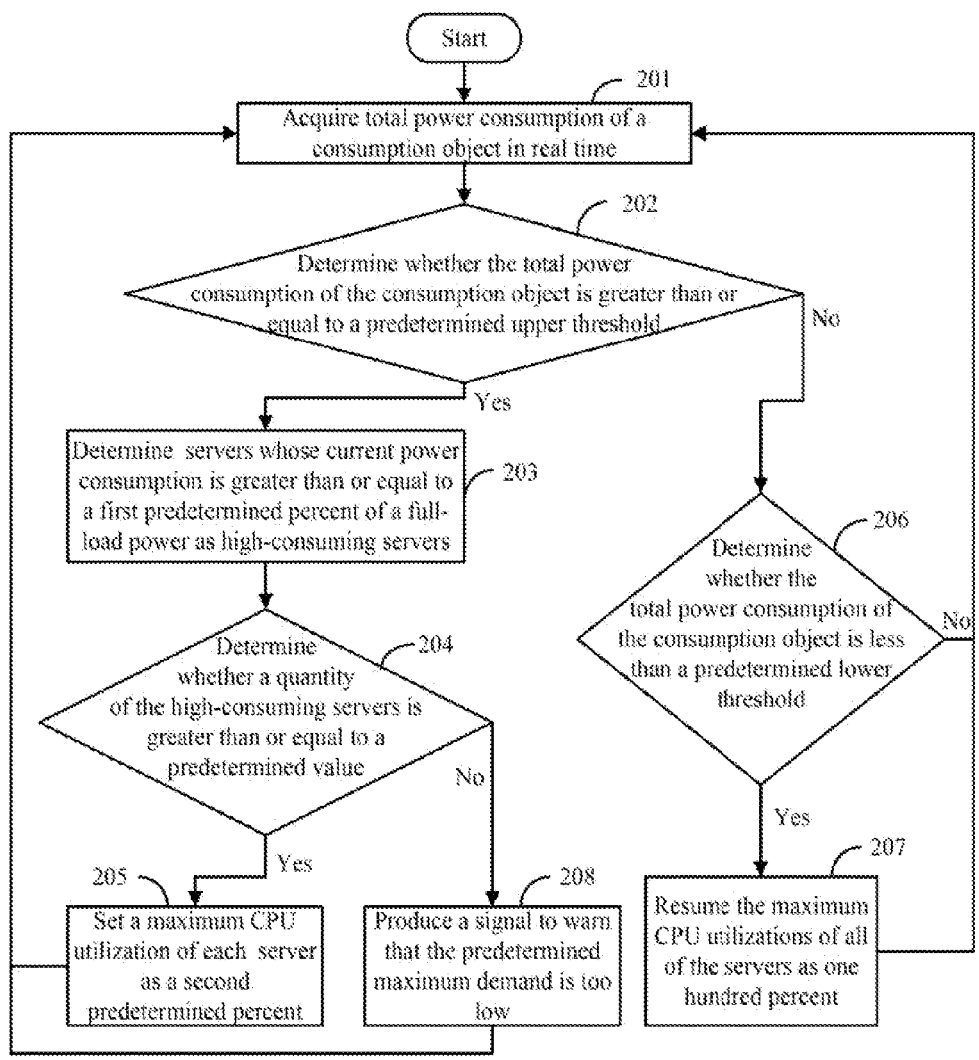
FIG. 2 illustrates a flowchart of a power consumption management method of one embodiment.

FIG. 2 illustrates a flowchart of a power consumption management method. The method is provided by way of example, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, an acquiring module acquires total power consumption of a consumption object in real time, the consumption object includes one or more servers.

At block 202, a first determining module determines whether the total power consumption of the consumption object is greater than or equal to a predetermined upper threshold. If the total power consumption of the consumption object is greater than or equal to a predetermined upper threshold, the process jumps to block 203, if the total power consumption of the consumption object is less than a predetermined upper threshold, the process jumps to block 206.

At block 203, when the total power consumption of the consumption object is greater than or equal to the predetermined upper threshold, a second determining module determines the servers whose current power consumption is greater than or equal to a first predetermined percent of a full-load power as high-consuming servers.

At block 204, a third determining module determines whether a quantity of the high-consuming servers is greater than or equal to a predetermined value. If the quantity of the high-consuming servers is greater than or equal to the predetermined value, the process jumps to block 205, if the quantity of the high-consuming servers is less than the predetermined value, the process jumps to block 208.

At block 205, when the quantity of the high-consuming servers is greater than or equal to the predetermined value, a setting module sets a maximum CPU utilization of each server as a second predetermined percent.

At block 206, a fourth determining module determines whether the total power consumption of the consumption object is less than a predetermined lower threshold.

At block 207, when the total power consumption of the consumption object is less than the predetermined lower threshold, a resuming module resumes the maximum CPU utilizations of all of the servers as one hundred percent.

At block 208, when the quantity of the high-consuming servers is less than the predetermined value and the total power consumption of the consumption object is greater than or equal to the predetermined upper threshold, a warning module produces a signal to warn that the predetermined maximum demand is too low.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A power consumption management system comprising:
at least one processor; and
a plurality of modules which are collections of instructions executable by the at least one processor, the plurality of modules comprising:
an acquiring module configured to, upon execution by the at least one processor, cause the at least one processor to acquire total power consumption of a consumption object in real time, wherein the consumption object comprises one or more servers;
a first determining module configured to, upon execution by the at least one processor, cause the at least one processor to determine whether the total power consumption of the consumption object is greater than or equal to a predetermined upper threshold;
a second determining module configured to, upon execution by the at least one processor, cause, when the total power consumption of the consumption object is greater than or equal to the predetermined upper threshold, the at least one processor to determine the one or more servers whose current power consumption is greater than or equal to a first predetermined percent of a full-load power as high-consuming servers;
a third determining module configured to, upon execution by the at least one processor, cause the at least one processor to determine whether a quantity of the high-consuming servers is greater than or equal to a predetermined value; and
a setting module configured to, upon execution by the at least one processor, cause, when the quantity of the high-consuming servers is greater than or equal to the predetermined value, the at least one processor to set a maximum central processing unit (CPU) utilization of each server as a second predetermined percent.

2. The power consumption management system according to claim 1, wherein the consumption object further comprises one or more racks and/or one or more air conditioners, the acquiring module acquires a sum of power consumption of the racks and the servers, or a sum of the power consumption of the servers and the air conditioners, or a sum of the power consumption of the racks, the servers, and the air conditioners to acquire the total power consumption of the consumption object.

3. The power consumption management system according to claim 2, wherein the plurality of modules further comprising:
a fourth determining module configured to, upon execution by the at least one processor, cause, when the total power consumption of the consumption object is less than the predetermined upper threshold, the at least one processor to determine whether the total power consumption of the consumption object is less than a predetermined lower threshold; and
a resuming module configured to, upon execution by the at least one processor, cause, when the total power consumption of the consumption object is less than the predetermined lower threshold, the at least one processor to resume the maximum CPU utilizations of all of the servers as one hundred percent.

4. The power consumption management system according to claim 2, wherein the plurality of modules further comprising:
a warning module configured to, upon execution by the at least one processor, cause, when the quantity of the high-consuming servers is less than the predetermined value and the total power consumption of the consumption object is greater than or equal to the predetermined upper threshold, the at least one processor to produce a signal to warn that the predetermined maximum demand is too low.

5. A power consumption management method comprising:
acquiring total power consumption of a consumption object in real time, wherein the consumption object comprises one or more servers;

determining whether the total power consumption of the consumption object is greater than or equal to a predetermined upper threshold;

determining the one or more servers whose current power consumption is greater than or equal to a first predetermined percent of a full-load power as high-consuming servers, when the total power consumption of the consumption object is greater than or equal to the predetermined upper threshold;

determining whether a quantity of the high-consuming servers is greater than or equal to a predetermined value; and setting a maximum CPU utilization of each server as a second predetermined percent when the quantity of the high-consuming servers is greater than or equal to the predetermined value.

6. The power consumption management method according to claim 5, wherein the consumption object further comprises one or more racks and/or one or more air conditioners, the method comprises acquiring a sum of power consumption of the racks and the servers, or a sum of the power consumption of the servers and the air conditioners, or a sum of the power consumption of the racks, the servers, and the air conditioners to acquire the total power consumption of the consumption object.

7. The power consumption management method according to claim 6, further comprising:

determining whether the total power consumption of the consumption object is less than a predetermined lower threshold, when the total power consumption of the consumption object is less than the predetermined upper threshold; and resuming the maximum CPU utilizations of all of the servers as one hundred percent when the total power consumption of the consumption object is less than the predetermined lower threshold.

8. The power consumption management method according to claim 6, further comprising:

producing a signal to warn that the predetermined maximum demand is too low, when the quantity of the high-consuming servers is less than the predetermined value and the total power consumption of the consumption object is greater than or equal to the predetermined upper threshold.

9. A power consumption management device comprising:

a storage device storing a plurality of modules which are collections of instructions; and at least one processor configured to execute the plurality of modules, the plurality of modules comprising:

an acquiring module configured to, upon execution by the at least one processor, cause the at least one processor to acquire total power consumption of a consumption object in real time, wherein the consumption object comprises one or more servers;

a first determining module configured to, upon execution by the at least one processor, cause the at least one processor to determine whether the total power consumption of the consumption object is greater than or equal to a predetermined upper threshold;

a second determining module configured to, upon execution by the at least one processor, cause, when the total power consumption of the consumption object is greater than or equal to the predetermined upper threshold, the at least one processor to determine the one or more servers whose current power consumption is greater than or equal to a first predetermined percent of a full-load power as high-consuming servers;

a third determining module configured to, upon execution by the at least one processor, cause the at least one processor to determine whether a quantity of the high-consuming servers is greater than or equal to a predetermined value; and a setting module configured to, upon execution by the at least one processor, cause, when the quantity of the high-consuming servers is greater than or equal to the predetermined value, the at least one processor to set a maximum CPU utilization of each server as a second predetermined percent.

10. The power consumption management device according to claim 9, wherein the consumption object further comprises one or more racks and/or one or more air conditioners, the acquiring module acquires a sum of power consumption of the racks and the servers, or a sum of the power consumption of the servers and the air conditioners, or a sum of the power consumption of the racks, the servers, and the air conditioners to acquire the total power consumption of the consumption object.

11. The power consumption management device according to claim 10, wherein the plurality of modules further comprising:

a fourth determining module configured to, upon execution by the at least one processor, cause, when the total power consumption of the consumption object is less than the predetermined upper threshold, the at least one processor to determine whether the total power consumption of the consumption object is less than a predetermined lower threshold; and a resuming module configured to, upon execution by the at least one processor, cause, when the total power consumption of the consumption object is less than the predetermined lower threshold, the at least one processor to resume the maximum CPU utilizations of all of the servers as one hundred percent.

12. The power consumption management device according to claim 10, wherein the plurality of modules further comprising:

a warning module configured to, upon execution by the at least one processor, cause, when the quantity of the high-consuming servers is less than the predetermined value and the total power consumption of the consumption object is greater than or equal to the predetermined upper threshold, the at least one processor to produce a signal to warn that the predetermined maximum demand is too low.

* * * * *